(12) United States Patent
Matsumoto et al.

(10) Patent No.: US 7,649,494 B2
(45) Date of Patent: Jan. 19, 2010

(54) GPS RECEIVER

(75) Inventors: Kazumi Matsumoto, Shiojiri (JP); Maho Terashima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 565 days.

(21) Appl. No.: 11/446,216

(22) Filed: Jun. 5, 2006

(65) Prior Publication Data

US 2006/0280233 A1    Dec. 14, 2006

(30) Foreign Application Priority Data

Jun. 9, 2005    (JP)    ............... 2005-169173

(51) Int. Cl.
    *G01S 1/00*    (2006.01)
(52) U.S. Cl. .............. 342/357.12; 340/426.19; 340/539.13; 342/357.06; 701/213; 701/215
(58) Field of Classification Search ............ 340/426.19, 340/539.13; 342/357.06, 357.12; 701/213, 701/215
    See application file for complete search history.

(56) References Cited

U.S. PATENT DOCUMENTS

| | | |
|---|---|---|
| 4,894,662 A | 1/1990 | Counselman |
| 5,293,170 A | 3/1994 | Lorenz et al. |
| 6,297,771 B1 | 10/2001 | Gronemeyer |
| 6,329,946 B1 * | 12/2001 | Hirata et al. ........... 342/357.12 |
| 6,496,145 B2 | 12/2002 | Gronemeyer |
| 6,577,271 B1 | 6/2003 | Gronemeyer |
| 6,917,331 B2 | 7/2005 | Gronemeyer |

FOREIGN PATENT DOCUMENTS

| | | |
|---|---|---|
| JP | 2000-193735 A | 7/2000 |
| JP | 2001-349935 A | 12/2001 |
| JP | 2002-540433 A | 11/2002 |
| JP | 2004-012379 A | 1/2004 |
| KR | 2001-94752 A | 11/2001 |
| WO | WO-00/31888 A | 6/2000 |
| WO | WO 00/58745 | 10/2000 |
| WO | WO-01/40821 A1 | 6/2001 |
| WO | WO-03/017503 A2 | 2/2003 |

* cited by examiner

*Primary Examiner*—Mohammad H Ghayour
*Assistant Examiner*—Adolf Dsouza
(74) *Attorney, Agent, or Firm*—Global IP Counselor, LLP

(57) ABSTRACT

A GPS receiver which performs correlation processing by using replicas of C/A codes generated in the GPS receiver after a GPS signal received from a GPS satellite is subjected to accumulating processing, wherein in the accumulating processing, a plurality of signals for integrating generated in the GPS receiver by predicting modulation of the GPS signal by a navigation message are integrated with the received GPS signal, and results of the integration are accumulatively added.

2 Claims, 3 Drawing Sheets

F I G. 1
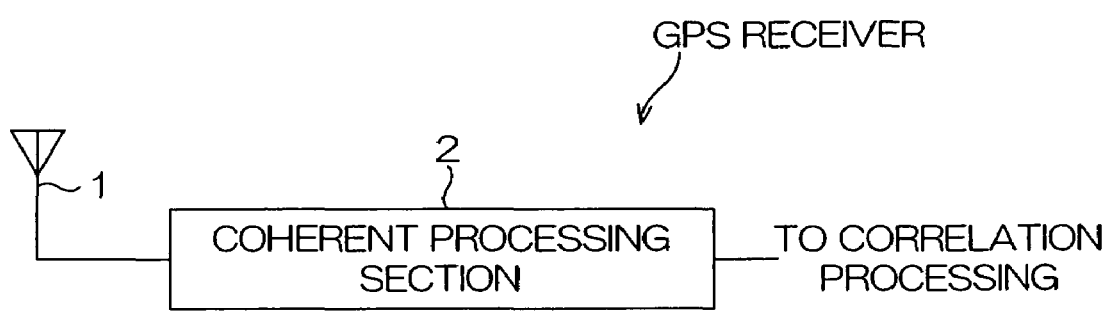

GPS RECEIVER

This application claims the priorities benefit under 35 U.S.C.§ 119 of Japanese Patent Application No. 2005-169173 filed on Jun. 9, 2005, which is hereby incorporated in its entirety by reference.

BACKGROUND

1. Technical Field

The present invention relates to processing performed in a GPS receiver and, more particularly, to coherent processing performed prior to correlation processing.

2. Related Art

In a GPS receiver, the following correlation processing is performed. That is, for C/A (Clear and Acquisition or Coarse and Access) codes constituting a received GPS signal, C/A codes generated on the basis of an internal timer of the GPS receiver are sequentially integrated while shifting time. A shift amount at time when an integration result is maximum is defined as arrival time of the GPS signal. However, when the intensity of the GPS signal is weak (i.e., when the intensities of the C/A codes are weak), the maximum integration result cannot be specified in the integration results. For this reason, in a high-sensitive GPS receiver, in order to specify the maximum integration result in the integration results even when the integration of a GPS signal is weak, coherent processing which accumulatively adds C/A codes to increase the intensities of the C/A codes is performed prior to correlation processing.

However, for C/A codes serving as targets of the coherent processing, a navigation message such as almanac data or ephemeris data is coded. In the navigation message, C/A codes of 20 cycles are set as 1 bit. Therefore, the C/A codes maybe inverted in polarity every 20 cycles. When the C/A codes are simply accumulatively added, cancellation is caused by the polarity inversion, and high sensitivity cannot be achieved.

Therefore, as a related art, the following inventions are proposed (JP A-2000-193735 and JP A-2001-349935). That is, before C/A codes are accumulatively added to each other, polarity inversion of the C/A codes is corrected on the basis of a navigation message modulated in a received GPS signal or an externally acquired navigation message.

However, it takes a long time to acquire a navigation message from a GPS signal.

And for example, as in the third-generation mobile communication scheme (3G) or the like, an external navigation message may not be provided to a GPS receiver.

SUMMARY

Therefore, an advantage of some aspects of the present invention is to provide a GPS receiver which corrects polarity inversion of C/A codes without using an externally acquired navigation message to make it possible to accumulatively add the C/A codes in coherent processing performed prior to correlation processing.

According to a first aspect of the invention, the advantage is attained by a GPS receiver which performs correlation processing by using replicas of C/A codes generated in the GPS receiver after accumulating processing for GPS signals received from GPS satellites, wherein, in the accumulating processing, a plurality of signals for integrating generated in the GPS receiver by predicting modulation of the GPS signals by a navigation message are integrated with the received GPS signals, and results of the integration are accumulatively added.

According to the configuration of the first aspect of the invention, the GPS receiver can integrate the plurality of signals for integrating generated in the GPS receiver with the received GPS signals prior to correlation processing. As described above, although the GPS signal is modulated by the navigation message, the plurality of signals for integrating are generated by predicting modulation of the GPS signals by the navigation message, and any one of the signals for integrating is equal to the modulated GPS signal.

For this reason, in coherent processing, even if the intensity of a GPS signal is weak, polarity inversion of C/A codes can be corrected without using an externally acquired navigation message. Therefore, according to the first aspect of the invention, even when a navigation message is not externally provided, a high-sensitive GPS receiver can be provided.

According to a second aspect of the invention, the advantage is attained by a GPS receiver which includes a receiving means which receives GPS signals modulated by a navigation message; a signal for integrating generating means which predicts modulation of the GPS signals by the navigation message and generates a plurality of signals for integrating having bit patterns different from each other while making phases different at predetermined intervals; an integrating means which integrates the signals for integrating with the GPS signals received by the receiving unit; and an accumulative adding means which accumulatively adds signals output from the integrating unit.

According to the configuration of the second aspect of the invention, modulation of the GPS signal by the navigation message is predicted, the plurality of signals for integrating having bit patterns different from each other are generated while making phases different at predetermined intervals, and the plurality of generated signals for integrating are integrated with the GPS signal. Any one of the signals for integrating has approximately the same bit pattern as that of the GPS signals modulated by the navigation message.

Therefore, according to the configuration of the second aspect of the invention, signals each having the almost same bit pattern as that of the received GPS signal are integrated with the GPS signal. In this case, polarity inversion of C/A codes constituting the received GPS signal is corrected.

For this reason, according to the second aspect of the invention, with respect to any one of a plurality of signals output from the integrating means, the C/A codes are not canceled even if the signals are accumulatively added.

In this manner, according to the configuration of the second aspect of the invention, in coherent processing, the polarity inversion of the C/A codes can be corrected without using an externally acquired navigation message. Therefore, according to the second aspect of the invention, even when a navigation message is not externally provided, a high-sensitive GPS receiver can be provided.

A third aspect of the invention is a GPS receiver wherein, in the configuration according to the second aspect of the invention, the predetermined interval is one cycle of the C/A codes or more, and less than the one-bit length of the navigation message.

When the predetermined interval is less than one cycle of the C/A codes, the number of signals integrated with the received GPS signal becomes large. For this reason, time required for coherent processing becomes long, and the coherent processing becomes inefficient. When the predetermined interval is one bit of the navigation message or more, a signal having the almost the same bit pattern as that of the received GPS signal cannot be generated. For this reason, even if the received GPS signal and the generated signal are integrated with each other, polarity inversion of the C/A codes in the received GPS signal cannot be corrected, the integration is a waste of time, and the coherent processing becomes inefficient. As in the third aspect of the invention, when the predetermined interval is one cycle of the C/A codes or more, and less than the one-bit length of the navigation message, the coherent processing can be efficiently performed.

A fourth aspect of the invention is a GPS receiver wherein, in the configuration according to anyone of the second and third aspects of the invention, a range of accumulative addition by the accumulative adding means is a one-bit length of the navigation message or more.

According to the configuration of the fourth aspect of the invention, since the range of accumulative addition by the accumulative adding means is the one-bit length of the navigation message or more, even if the intensity of the received GPS signal is weak, the intensity is increased by the accumulative addition, and correlation can be achieved.

A fifth aspect of the invention is a GPS receiver wherein, in the configuration according to anyone of the second to fourth aspects of the invention, correlation processing is performed by using a plurality of signals output from the accumulative adding means.

According to the configuration of the fifth aspect of the invention, in the coherent processing, even when the intensity of the received signal is weak, polarity inversion of the C/A codes can be corrected without using an externally acquired navigation message. Therefore, according to the fifth aspect of the invention, even when an external navigation message is not provided, correlation processing can be performed even to a GPS signal having a weak intensity, and a high-sensitive GPS receiver can be provided.

BRIEF DESCRIPTION OF THE DRAWINGS

The invention will be described with reference to the accompanying drawings, wherein like numbers reference like elements.

FIG. 1 is a diagram showing a part of a GPS receiver according to an embodiment of the present invention.

DESCRIPTION OF EXEMPLARY EMBODIMENTS

Preferred embodiments to execute the present invention will be described below in detail with reference to the accompanying drawings.

FIG. 1 is a diagram showing a part of a GPS receiver according to an embodiment of the present invention.

As shown in FIG. 1, a GPS receiver according to the embodiment of the present invention includes, as a part, an antenna 1 and a coherent processing unit 2. The antenna 1 is an example of a receiving means. The coherent processing unit 2 is an example of a signal for integrating generating means, an integrating means, and an accumulative adding means.

In the GPS receiver shown in FIG. 1, GPS signals transmitted from a GPS satellites are received by the antenna land input to the coherent processing unit 2 directly or through any configuration. C/A codes constituting the GPS signal are modulated by a navigation message.

Figure 2:
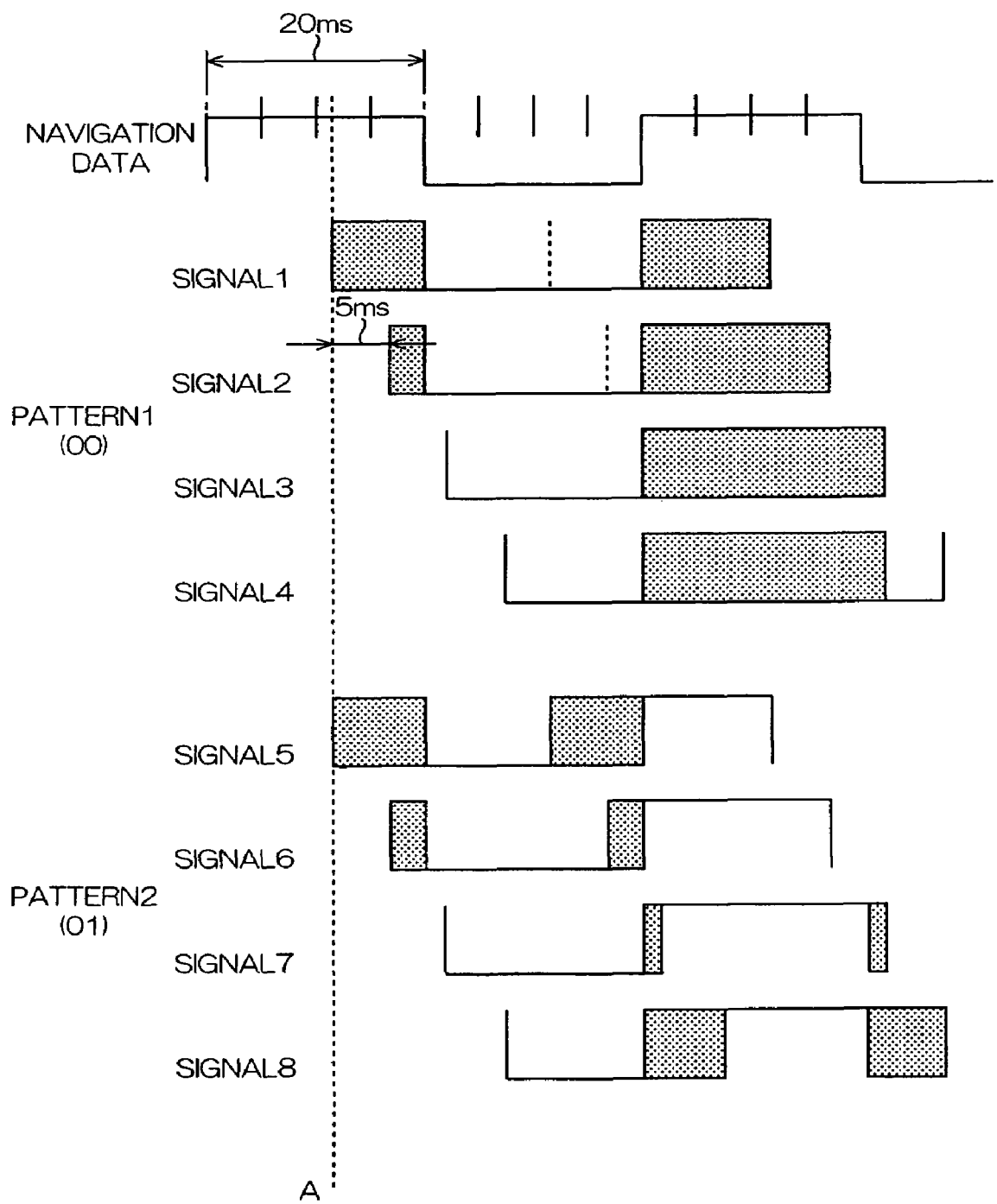
FIG. 2 is a diagram showing processing performed before accumulative adding in a coherent processing unit 2.

The GPS signals input to the coherent processing unit 2 are subjected to predetermined processing described in FIG. 2, accumulatively added, and output from the coherent processing unit 2. The signals output to the coherent processing unit 2 are subjected to correlation processing. The detailed description of an accumulative adding method is not provided here.

The GPS receiver is designed to perform correlation processing which correlates replicas of the C/A codes generated in the GPS receiver with the results of accumulative adding in the coherent processing unit 2.

Figure 3:
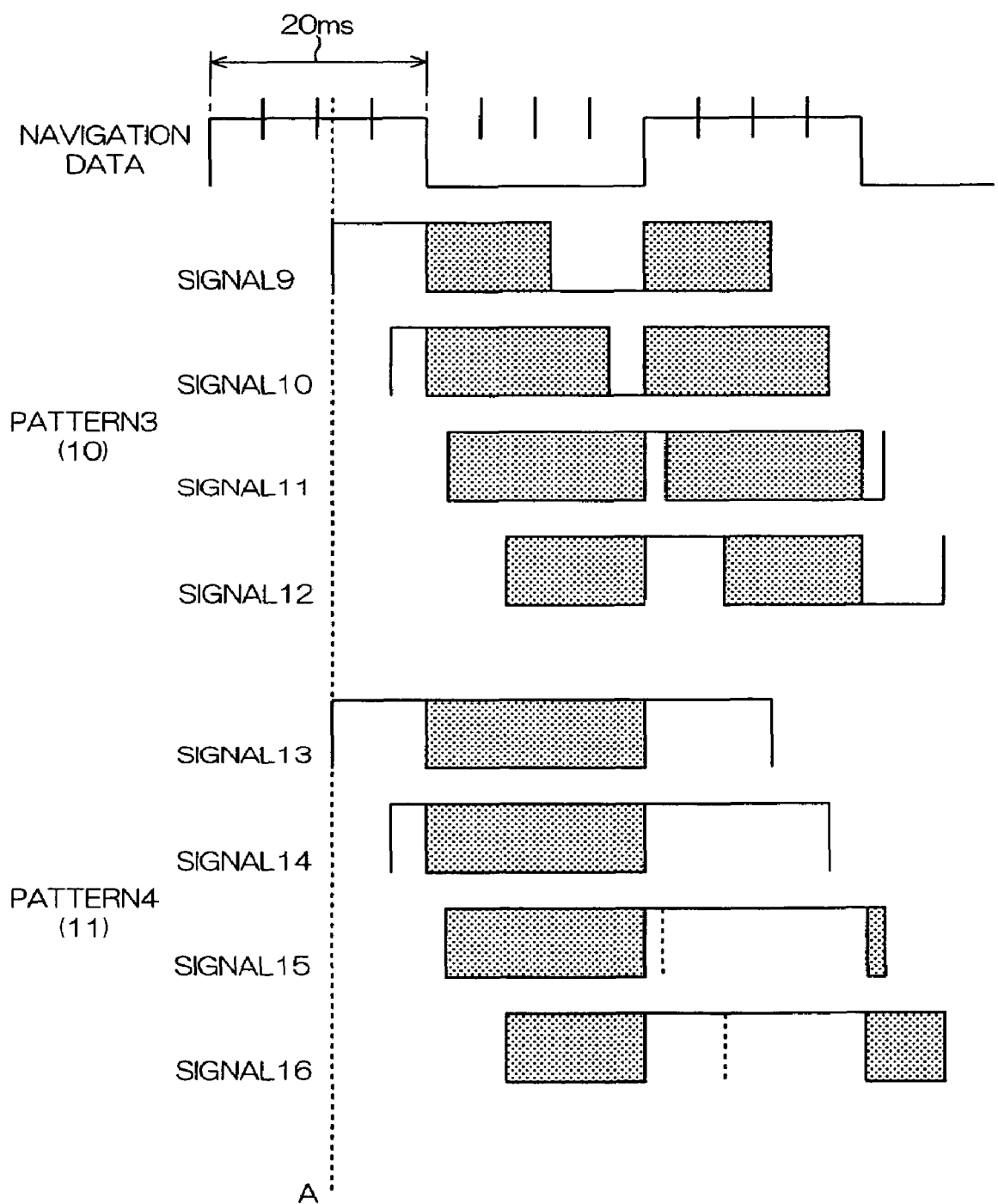
FIG. 3 is a diagram showing processing performed before accumulative adding in the coherent processing unit 2.

FIGS. 2 and 3 are diagrams showing processing performed before accumulative adding in the coherent processing unit 2. In FIGS. 2 and 3, for easier understanding of the invention, a navigation message is coded in two bits, and a one-bit length of the navigation message is set at 20 milliseconds.

In the coherent processing unit 2, before accumulative adding, 16 signals (signal 1, signal 2, ..., signal 16) generated in the coherent processing unit 2 shown in FIG. 2 are integrated with the received GPS signal (to be referred to as a "received signal" hereinafter) respectively. The signals 1 to 16 are examples of signals for integrating.

A result obtained by integrating the received signal and the signal 1, a result obtained by integrating the received signal and the signal 2, ..., a result obtained by integrating the received signal and the signal 16 are accumulatively added.

36 As shown in FIGS. 2 and 3, the signals 1 to 4, the signals 5 to 8, the signals 9 to 12, and the signals 13 to 16 have bit patterns different from each other. As shown in FIGS. 2 and 3, the signals 1, 2, 3, and 4 are different in phase by 5 milliseconds each. In the same manner, the signals 5, 6, 7, and 8 are different in phase by 5 milliseconds each, the signals 9, 10, 11, and 12 are different in phase by 5 milliseconds each, and the signals 13, 14, 15, and 16 are different in phase by 5 milliseconds each.

Since the navigation message is coded in two bits, the bit pattern of the received signal is any one of (00), (01), (10), and (11). However, the GPS receiver cannot know a bit pattern held by the received signal when the received signal is received by the antenna 1. However, if four conceivable bit patterns, i.e., the signals 1 to 4, the signals 5 to 8, the signals 9 to 12, and the signals 13 to 16 shown in FIGS. 2 and 3 are integrated with the received signal respectively, any one of the patterns of the signals 1 to 4, the signals 5 to 8, the signals 9 to 12, and the signals 13 to 16 is integrated with the received signal as a signal having the same bit pattern as that of the received signal.

More specifically, the signals 1 to 16 are generated by predicting modulation of the GPS signal by the navigation message.

The GPS receiver does not know the phase of the received signal when the received signal is received by the antenna 1. Therefore, the signals 1 to 16 are integrated with the received signal at an arbitrary timing. However, the signals 1 to 4 are different in phase by 5 milliseconds each, the signals 5 to 8 are different in phase by 5 milliseconds each, the signals 9 to 12 are different in phase by 5 milliseconds each, and the signals 13 to 16 are different in phase by 5 milliseconds each. Therefore, any one of the signals 1 to 16 is integrated with the received signal at a timing at which the phase of the corresponding signal has become substantially equal to the phase of the received signal.

As described above, the GPS receiver does not know the bit pattern and the phase of the received signal when the received signal is received by the antenna 1. However, at least one of the signals 1 to 16 is a signal having the same bit pattern as that of the received signal and a phase almost equal to that of the received signal. For this reason, when the signals 1 to 16 are integrated with the received signal, in at least one integration of the 16 integrations, a product of a signal having the same bit pattern as that of the received signal and a phase equal to that of the received signal and the received signal is calculated. Therefore, according to the embodiment of the present invention, in at least one of the 16 integrating results, polarity inversion of the C/A codes is corrected. Therefore, when the 16 integrating results are accumulatively added, the C/A codes are accumulatively added without being canceled with respect to at least one of the 16 integrating results. For this reason, at least one of the 16 signals output from the coherent processing unit 2 after the accumulative adding is subjected to coherent processing while suppressing cancellation of the C/A codes.

As described above, in the GPS receiver according to the present embodiment, prior to correlation processing, a plurality of signals generated in the GPS receiver are integrated with a received GPS signal, and the integrating results are accumulatively added, so that polarity inversion of C/A codes is corrected without using a navigation message modulated into the received GPS signal or an externally acquired navigation message. Therefore, in the GPS receiver according to the embodiment, even when a navigation message is not externally provided, a high-sensitive GPS receiver can be realized.

In the above description, the four conceivable bit patterns of the signals 1 to 4, the signals 5 to 8, the signals 9 to 12, and the signals 13 to 16 are integrated with the received signal. However, the pattern of the signals 1 to 4 is the same as that of the signals 13 to 16 except that the patterns have polarities inverted from each other. For this reason, since an integrating result of the signals 1 to 4 and the received signal and an integrating result of the signals 13 to 16 and the received signal have inverted polarities, by using only one of the pattern of the signals 1 to 4 and the pattern of the signals 13 to 16, correlation can be achieved in correlation processing. This applies to the signals 5 to 8 and the signals 9 to 12. If any one of the pattern of the signals 1 to 4 and the pattern of the signals 5 to 8 and any one of the pattern of the signals 9 to 12 and the pattern of the signals 13 to 16 is integrated with the received signal, an amount of arithmetic processing in the GPS receiver can be made smaller than that used when the four bit patterns of the signals 1 to 4, 5 to 8, 9 to 12, and 13 to 16 are integrated with the received signal. For this reason, a load on the GPS receiver can be reduced.

In the above description, a plurality of signals constituting the same bit pattern are four signals which are different in phase by 5 milliseconds each. In this manner, unlike in a configuration in which signals are different in phase by 1 millisecond each, polarity inversion of C/A codes can be corrected without arranging CPU having high throughput and a memory having a large capacity. As a matter of course, in this case, timings of integrating are different by 5 milliseconds each, a deterioration is −3 dB at a maximum when the bits are inverted every time. However, in fact, the bit patterns may not change. If the probability of changing the bit patterns is assumed to be 50%, the deterioration is about −2 dB. When a difference of timings of integrating is considered as 2.5 milliseconds on an average, a deterioration is −0.9 dB, and an advantage of about +5 dB can be obtained as a whole.

The embodiment described above is explained from the viewpoint to make it easy to understand the invention, and the invention is not limited to the embodiment as a matter of course.

For example, in the embodiment, a navigation message is coded in two bits. However, in the present invention, the navigation message may be coded in an arbitrary number of bits. In the present invention, when the navigation message is coded in N bits, signals of $2^N$ bit patterns are made different at predetermined intervals and integrated with the received signal.

For example, in the embodiment, the phases of the signals 1 to 4 are made different by 5 milliseconds each on the ground that one-bit length of the navigation message is set at 20 milliseconds and that the effect of suppressing cancellation of the C/A codes is matched with time required for coherent processing. The invention does not limit the differences in phase of the signals 1 to 4. The differences in phase of the signals 1 to 4 are desirably one cycle of the C/A code or more and less than a one-bit length of the navigation message from the viewpoint of matching between the effect of suppressing cancellation of the C/A codes and time required for the coherent processing. However, the invention includes all GPS receivers whose signals of certain bit patterns are made different in phase and integrated with a received signal. This applies to the signals 5 to 8, the signals 9 to 12, and the signals 13 to 16. For example, if signals having the same bit patterns are made different by 4 milliseconds each, 20 signals (to be referred to as signals 1*a* to 20*a*) are generated. In this case, the signals 1*a* to 5*a* have the same bit patterns and are different in phase by 4 milliseconds each, the signals 6*a* to 10*a* have the same bit patterns and are different in phase by 4 milliseconds each, the signals 11*a* to 15*a* have the same bit patterns and are different in phase by 4 milliseconds each, and the signals 16*a* to 20*a* have the same bit patterns and are different in phase by 4 milliseconds each.

The invention does not limit a range of accumulative adding at all. However, if the range is a one-bit length of a navigation message or more, the intensity of a received GPS signal is increased by accumulative adding even when the intensity is weak. For this reason, correlation can be achieved. For example, in the embodiment, when the one-bit length of the navigation message and the range of accumulative adding are set at 20 milliseconds and 40 milliseconds, respectively, a sensitivity is improved by 6 dB (four times), and incoherence time is shortened to 1/16 in comparison with a case in which the range of accumulative adding is set at 10 milliseconds. In this manner, according to the embodiment, even if a unit of accumulative adding is set at a 2-bit length, coherent processing can be sufficiently performed for time shorter than that required in a related art because polarity inversion of C/A codes is corrected. For this reason, a circuit scale, an operation frequency, a memory size, and the like in a GPS receiver can be saved. In proportion to the values, a cost, a power consumption, and the like can be reduced.

What is claimed is:

1. A GPS receiver comprising:

receiving means that receives GPS signals modulated by a navigation message;

bit pattern signal generating means that predicts modulation of the GPS signals by the navigation message, and generates bit pattern signals corresponding to each of a plurality of bit patterns that differ from each other while making phases different at predetermined intervals, the number of the bit pattern signals corresponding to each of the plurality of bit patterns being obtained by dividing a 1-bit length of the navigation message by the predetermined interval, the predetermined interval being equal to or more than one cycle of C/A codes and less than the 1-bit length of the navigation massage;

integrating means that integrates each of the bit pattern signals generated by the bit pattern signal generating means with the GPS signals received by the receiving means; and accumulative adding means that accumulatively adds signals output from the integrating means, the C/A codes being Clear and Acquisition codes or Coarse and Access codes.

2. A method of controlling a GPS receiver, comprising:

receiving GPS signals modulated by a navigation message;

predicting modulation of the GPS signals by the navigation message, and generating bit pattern signals corresponding to each of a plurality of bit patterns that differ from each other while making phases different at predetermined intervals, the number of the bit pattern signals corresponding to each of the plurality of bit patterns being obtained by dividing a 1-bit length of the navigation message by the predetermined interval, the predetermined interval being equal to or more than one cycle of C/A codes and less than the 1-bit length of the navigation message;

integrating each of the bit pattern signals generated by the bit pattern signal generating means with the GPS signals received by the receiving means; and accumulatively adding signals output from the integrating means, the C/A codes being Clear and Acquisition codes or Coarse and Access codes.

* * * * *